United States Patent

Mueller et al.

Patent Number: 5,284,406
Date of Patent: Feb. 8, 1994

[54] FIXTURE AND METHOD FOR MACHINING ROTORS

[75] Inventors: Peter W. Mueller, Morrow; Dewey D. Dunkman, Cincinnati; Joseph T. Stevenson, Amelia; Elbert Stonom, Cincinnati, all of Ohio

[73] Assignee: General Electric Company, Cincinnati, Ohio

[21] Appl. No.: 825,350

[22] Filed: Mar. 6, 1992

Related U.S. Application Data

[62] Division of Ser. No. 613,340, Nov. 14, 1990, Pat. No. 5,101,557.

[51] Int. Cl.$^5$ ............................................. B23C 1/20
[52] U.S. Cl. ................................. 409/110; 408/241 B; 409/130; 409/178
[58] Field of Search ............ 409/97, 110, 130, 178, 409/179, 66, 84, 91, 119, 120, 131, 132, 198, 199, 293; 408/72 B, 241 B; 29/888.021, 889.1

[56] References Cited

U.S. PATENT DOCUMENTS 3,823,643  7/1974  Feucht et al. .................... 409/199
4,451,959  6/1984  Miller et al. .................... 29/889.1

FOREIGN PATENT DOCUMENTS 0236228  6/1986  Fed. Rep. of Germany ..... 29/889.1

OTHER PUBLICATIONS

United Drill Bushing Catalog. pp. 52, 53, Jun. 15, 1973.

Primary Examiner—Z. R. Bilinsky
Attorney, Agent, or Firm—Jerome C. Squillaro; Carmen Santa Maria

[57] ABSTRACT

The present invention provides a method and apparatus including a rotor mountable fixture for guiding a cutting tool powered by a hand held air motor to machine a gas turbine engine rotor without removing the rotor from its mountings in the engine. In one particular embodiment the fixture includes a root having the same contour as a blade root slot of a rotor, a base having a platform attached to the root, and a machining guide in the form of a bushing restrained in a guide slot operable to receive and guide a hand held air motor powered cutting tool for machining the rotor. The present invention provides an accurate means to machine a gas turbine engine rotor without removing the rotor from its mounting. In one particular embodiment a method for machining the rotor in the field is provided using a hand held air motor to power a machining tool to cut a blade damper pocket in the dovetail slot of a pressure compressor rotor.

3 Claims, 3 Drawing Sheets

FIXTURE AND METHOD FOR MACHINING ROTORS

BACKGROUND OF THE INVENTION

The Government has rights in this invention pursuant to Contract No. F33657-88C-2133 awarded by the Department of the Air Force.

This application is a division of application Ser. No. 613,340, filed Nov. 14, 1990, now U.S. Pat. No. 5,101,557.

FIELD OF THE INVENTION

This invention relates to machining of a gas turbine engine rotor without removing the rotor from the engine, and more particularly, to a fixture and method for machining a damper pocket in a high pressure compressor disk of an aircraft gas turbine engine rotor mounted in the engine.

DESCRIPTION OF RELATED ART

Machining of gas turbine engine rotors requires a great deal of accuracy to minimize the effect the machining process has on the structural integrity of the rotor particularly due to the centrifugal forces and vibrations induced by the great speeds at which the rotor spins. Machining of gas turbine engine rotors, and particularly those for aircraft engines for the purpose of repair, overhaul, modification or for any other reason requiring machining after engine assembly has required disassembly of the engine and removal of the rotor from its mountings so that it could be fixtured for the machining process. The procedure for removing the rotor from its mountings in the engine and its subsequent reassembly is time consuming, expensive and in general undesirable.

Fixturing of the rotor for a circumferentially repetitive process is prone to inaccuracy because the cutting machine is fixed, as is the reference frame for the cutting process, and therefore the rotor must be turned and refixtured for each machining operation at different circumferential positions around the rotor.

SUMMARY OF THE INVENTION

The present invention provides a method and apparatus including a rotor mountable fixture for guiding a machining tool powered by a hand held air motor to machine a gas turbine engine rotor without removing the rotor from its mountings in the engine.

One embodiment of the invention is a rotor mountable fixture having a root operable to be mounted in a blade root slot of a rotor, a base attached to said root, and a machining guide operably connected to the base to guide a tool for machining the rotor. The preferred embodiment includes a means to axially position the fixture root, a means to set the fixture, and a guide means in the form of a guide slot and bushing operable to receive and guide the machining tool.

ADVANTAGES

Among the advantages provided by the apparatus and method of the present invention is a savings of time required to disassemble the entire engine, remove and fixture the rotor to allow the rotor to be machined, and reassemble the rotor in the engine. In the particular case of a gas turbine engine having a split compressor case of the type found in the GE F101, GE F110, and CFM-56 engines only the casing has to be removed thereby exposing the high compressor disk of the rotor to be machined. Furthermore, by using a fixture that can be moved from slot to circumferentially adjacent slot, an entire row of posts or other part of the rotor may be machined with great accuracy because the frame of reference is always relative to the movable fixture and not a fixed machine. Using a fixtured rotor one has to refixture the rotor for each circumferentially adjacent machining operation as well as successive axial operations which would otherwise cause errors to stack up. The present invention avoids the errors and refixturing by allowing the fixture that guides the machining tool to be easily repositioned and set with the rotor remaining mounted in the engine.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
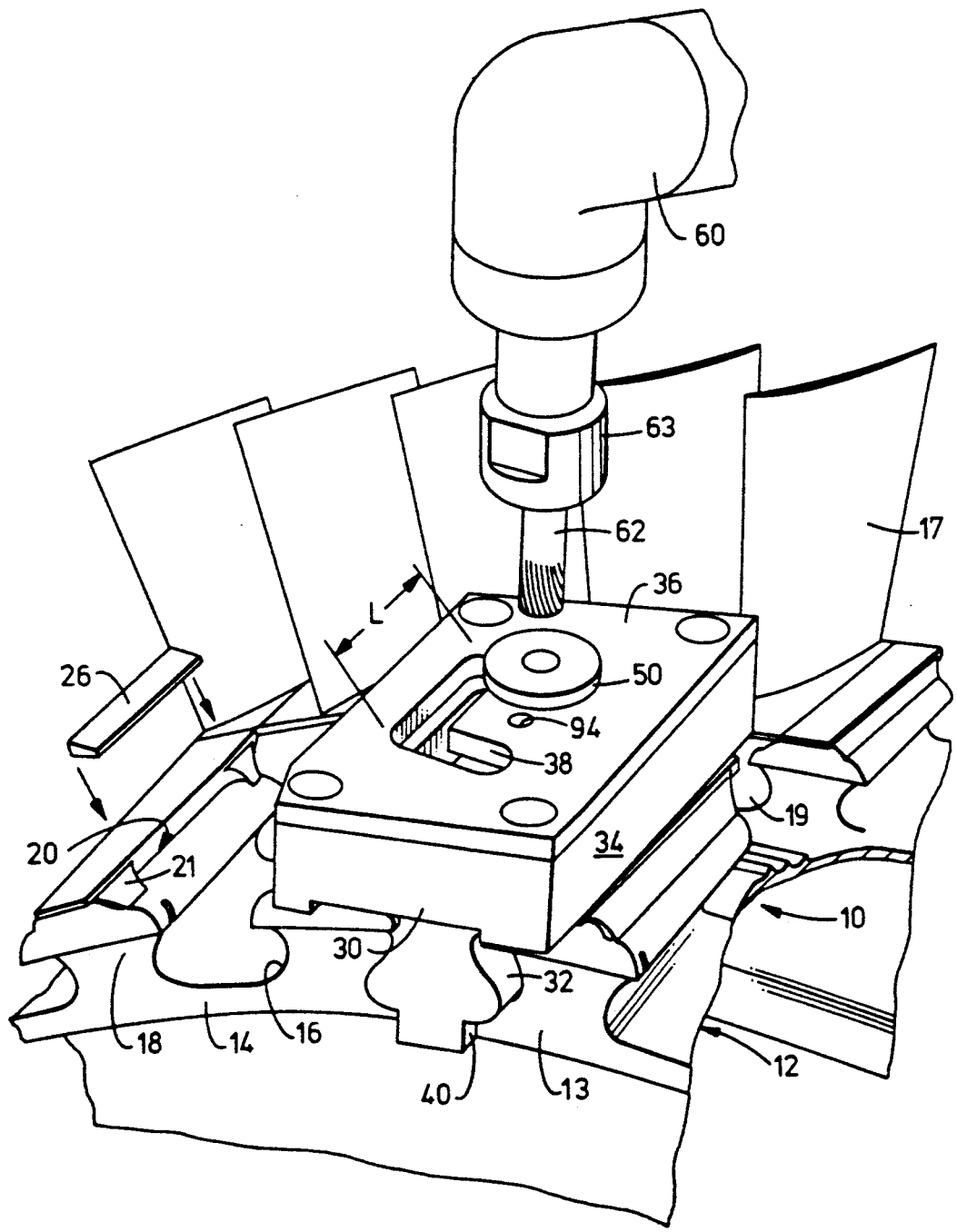
FIG. 1 is a perspective view of portion of a high pressure compressor section of a typical gas turbine engine rotor including a first fixture and machining apparatus in accordance with the present invention.

Referring to FIG. 1, a portion of a gas turbine engine rotor 10, typical of a section of the high pressure compressor is shown having a disk 12 including a circumscribing rim 14 with a plurality of circumferentially disposed blade slots 16, shown in FIG. 1 in the form of dovetail slots 16, cut therethrough forming dovetail posts 18 therebetween. Dovetail slots 16 are operable to receive compressor blades 17 having blade roots 19 which conform to and are designed to be received by dovetail slots 16. The present invention provides a fixture 30 including a fixture root 32 supporting a base 34 having a platform 36 and a template or tool guide 38 in the form of a guide slot cut therethrough operable for guiding a cutting machine 60 to machine a pocket 20 into the side of dovetail post 18 which is used for placing a blade damper 26 therein. In the preferred embodiment root 32 of fixture 30 is sized and shaped to conform to the cross section of blade slot 16, which is exemplified in the FIGS. as a dovetail slot, such that it can be easily slid into and firmly retained within dovetail slot 16. Fixture 30 further includes a tang 40 at its forward end to axially fix the position of fixture root 32 in dovetail slot 16 by butting up against a forward face 13 of disk rim 14 when fixture 30 is positioned in dovetail slot 16.

Figure 2:
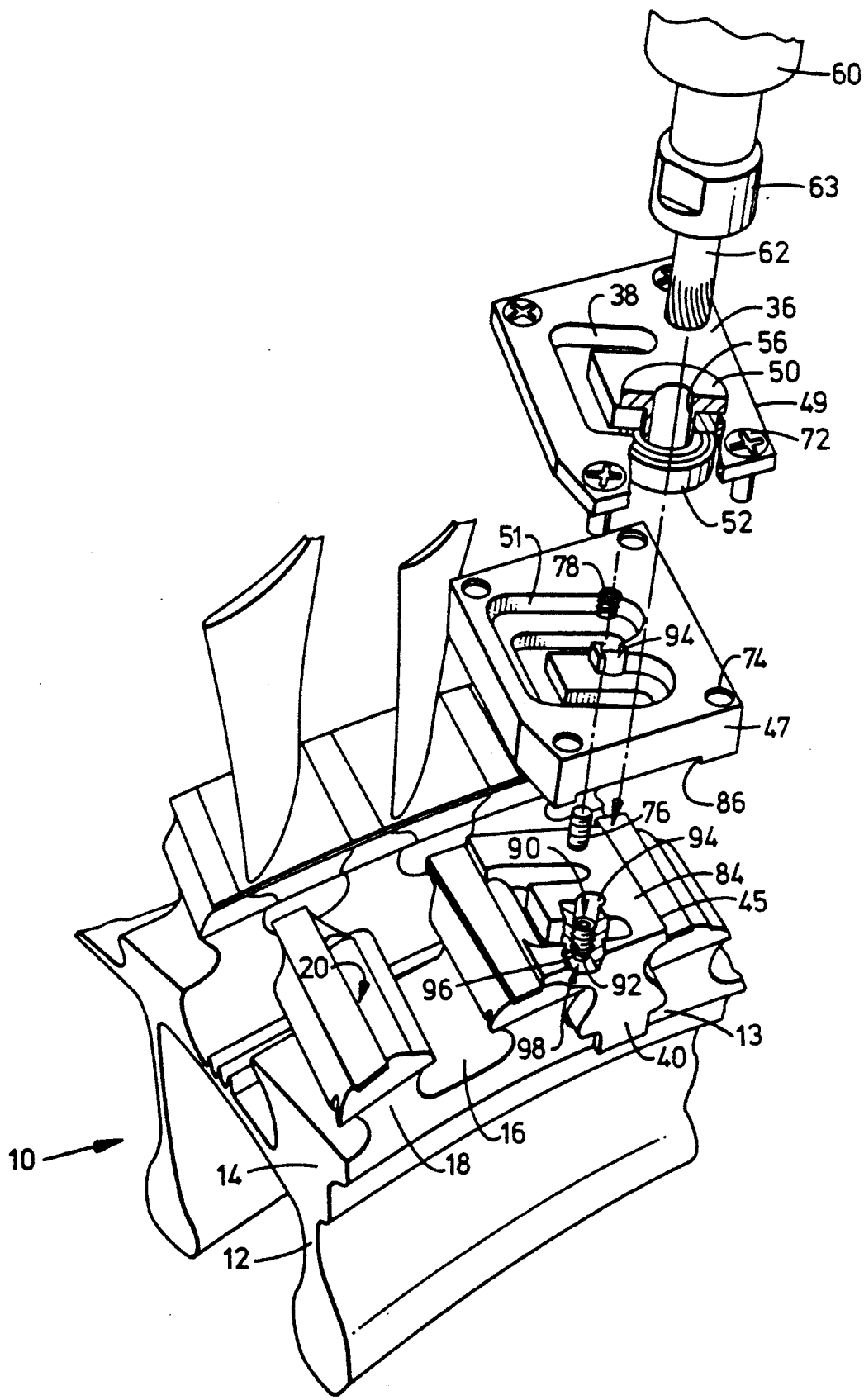
FIG. 2 is an exploded view of the fixture depicted in FIG. 1.
Figure 3:
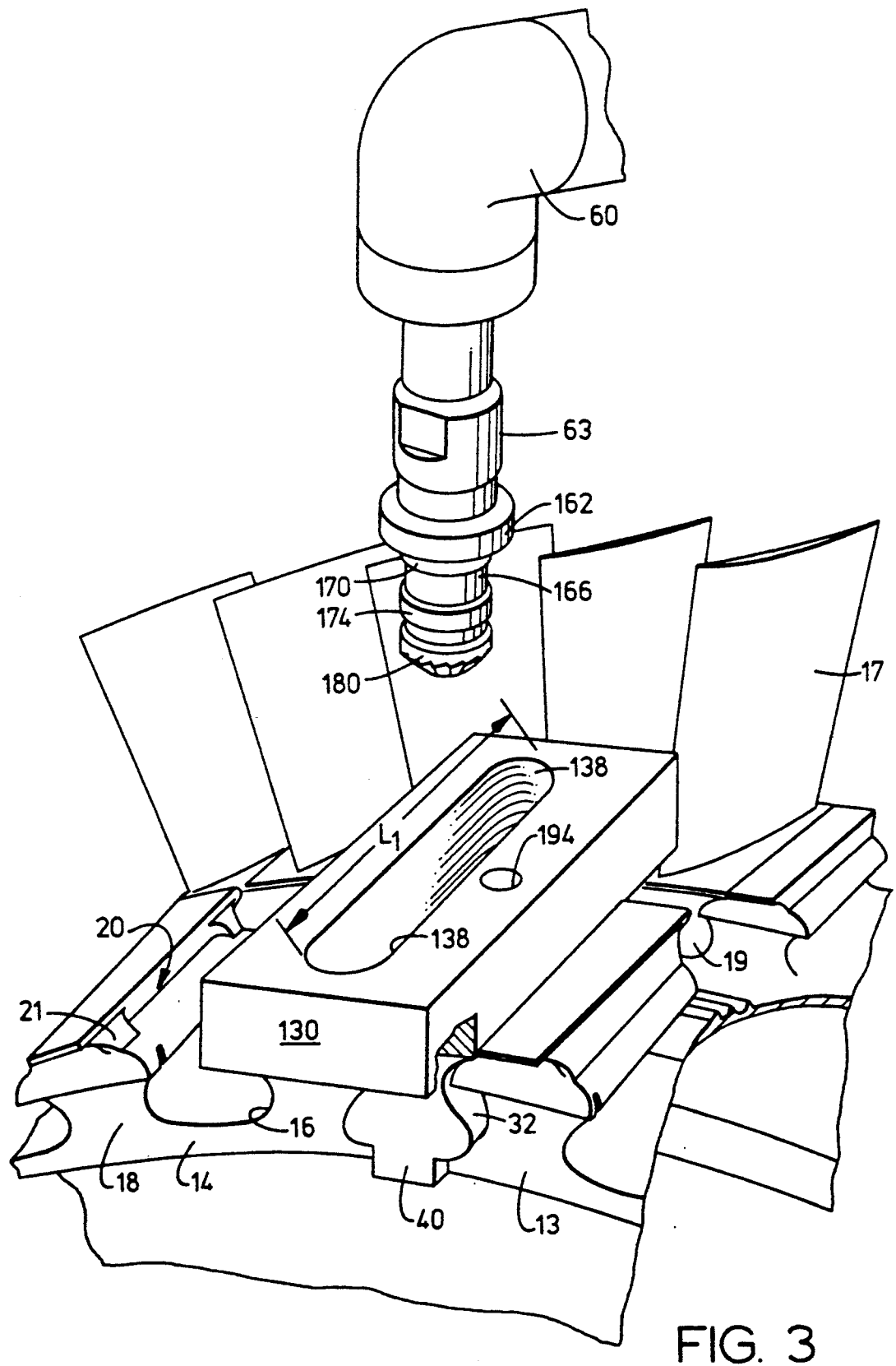
FIG. 3 is a perspective view of a second fixture and machining apparatus in accordance with the present invention.

In the preferred embodiment shown in FIG. 1, cutting machine 60 comprises a 90 degree offset air motor operable to receive and turn various tools such as a straight rotary file 62 as shown in FIGS. 1 and 2 and a contoured rotary file 180 as shown in FIG. 3. Referring again to FIG. 1, a bushing 50 is disposed through guide slot 38 operable to engage and be retained by platform 36 and operable to receive and guide tool 62 during the machining process.

FIG. 2 provides an exploded view of fixture 30 as contemplated by the preferred embodiment in which fixture 30 has three separate components a root section 45, a middle section 47, and a top section 49. This type of assembly provides a simplified means of construction including the fabrication of bushing 50. Bushing 50 includes a bushing bearing 52 securely mounted on and operable to spin about a bushing axle 56 disposed through guide slot 38 which is cut through top section 39. Bearing 52 is trapped in a chamber 51, by top section 49, which is operable to track and help guide bushing 50 as it guides tool 62 through its machining process.

A simple fixture assembly means is provided by which top section 49 is mounted to middle section 42 by four machine screws 72 disposed through top section 49 and received by tapped holes 74 disposed in middle section 42. Middle section 47 is restrained from circumferential and turning movement with respect to root section 45 by a rail 84 on top of the root section which is receivable in a slot like track 86 on the bottom of middle section 47 and is radially retained by a mount screw 76 disposed through the bottom (not shown) of root section 45 to be received in a tapped hole 78 of middle section 47.

A fixture set means disposed through all three sections allows fixture 30 to be axially set in dovetail slot 16. The set means includes a set hole 94 which passes through all three fixture sections 45, 47, and 49 and a tapped portion 96 in the bottom of set hole 94 through which is disposed an allen head screw 90 having a nylon tip 92 which engages a bottom surface 98 of dovetail slot 16.

The present invention, in one embodiment, provides an apparatus described above and a method to machine a blade damper pocket 20 into a dovetail post 18 such that the pocket is operable to receive a blade damper 26 as shown in FIG. 1. We have found this process to be particularly useful for machining a series of pockets in circumferentially adjacent posts 18 on a high pressure compressor rotor disk 12 including the machining of a bevel 21 across the surface of the dovetail post 18 from which the pocket has been cut. A first fixture 30 as shown in FIGS. 1 and 2 having a C-shaped guide slot 38 disposed therethrough and a bushing 50 constrained within the guide slot which is operable to receive a rotary file 62 for the purpose of cutting pocket 20. The length L of guide slot 38 corresponds to the length of pocket 20. Rotary files 62 are mounted in a chuck 63 of air motor 60.

The machining operation preparation begins by exposing the compressor rotor 10 and its compressor blades 17 which can easily be done on a gas turbine engine having a horizontally split case such as in a GE F110, CFM-56, and GE CF6 series aircraft engines. For example to machine a row of damper pockets 20 in a GE F110 engine, the engine is mounted in a horizontal position and the top inner and outer case is removed. We have found that in order to machine the dovetail posts of the respective Stage 1 blades the adjacent Stage 2 blades should be removed for clearance purposes. Having thus exposed the compressor disk 12 and its blades 17, the blades are removed from their dovetail slots 16 thereby exposing the dovetail slot for reception of fixture 30 and the surfaces of dovetail post 18 which are to be machined. If only a portion of the circumferentially disposed dovetail posts are to be machined then only the adjacent blades 17 must be removed to allow for the machining process. Rotor 10 is locked down to prevent rotation using straps mounted to the stage 1 dovetails and outer case (not shown). The rotor is then masked off to prevent metal chips from entering the engine during the machining process to prevent FOD damage during engine operation.

Having thus prepared the rotor for the machining process of the present invention the first step is to slide fixture 30 into dovetail slot 16 by its dovetail shaped root 32 until tang 40 is stopped by forward face 13 of disk rim 12 thereby axially positioning root 32 within dovetail slot 16 which in turn axially positions fixture 30 for the machining process. An allen head screwdriver, allen wrench is used to carefully turn down and tighten up allen head set screw 90 till its nylon tip 92 engages bottom surface 98 of dovetail slot 16 so as to prevent scratching or otherwise damaging the surface of the dovetail slot. Having thus set fixture 30, air tool 60 is then used to cut pocket 20 in a series of progressively deeper single pass cutting motions wherein each successive pass uses a longer extension of rotary files 62 from chuck 63. Rotary file 62 having been fixed in chuck 63 is then slid into bushing 50 and with drill 60 operating, is passed through dovetail post 18 so as to take a single depth cut to form pocket 20. We have found that with air motor 60 running at about 7000 rpm, the machining or cutting tool, rotary file 62, can slowly be moved through guide slot 38 to form a cut in dovetail post 18 with a single pass and to use multiple passes to fabricate the entire pocket 20.

We have found it advantageous to extend rotary file 62 from chuck 63 and set it to cut 10 mils for each pass. So that after the first pass, wherein rotary file is set to take a ten mil cut, rotary file 62 is progressively extended an additional 10 mils from the face or surface of chuck 63 to produce the successive cuts which form pocket 20. In summary, we have found that a 90 mil in depth pocket is best cut or machined in 9 passes of 10 mils each for machining the high compressor rotor.

Having thus machined pocket 20, the dovetail is now ready for the next step of the machining process shown in FIG. 3 which will cut a bevel 21 in the axially extending side of dovetail post 18 which has had pocket 20 machined into it. Having removed the first fixture used for cutting pocket 20, a second cutting fixture 130 is then inserted in dovetail slot 16 by its root 32 and is axially positioned as before with tang 40 being stopped by forward face 13 of disk rim 14. Second fixture 130 is set and fixed in the same manner as first fixture 30 described previously with set screw 90 in FIG. 2. The set screw in second fixture 130 is tightly screwed in through set screw access hole 194 which is similar to set screw hole 94 of the previous fixture shown in FIG. 2. Disposed in second fixture 130 is a second guide slot 138 having a cutting length L1 which is sufficiently longer than the widest width of rim 14. to allow for a single pass of beveling tool 180 to start from in back of dovetail post 18 and proceed fully across it, thereby allowing a complete single machining pass along dovetail post 18. As in the machining of pocket 20 the bevelling process should be made in successive steps, incorporating progressively deeper cuts of 10 mils. Bevelling tool 180, preferably an angular face cutter, is extended by using different size spacers 166 between inner and outer collet bearings 170 and 174 respectively of collet 162 to extend the depth of cut made by angular face cutter 180 for each pass.

After the cutting is completed the fixture is removed from the dovetail slot and all chips are vacuumed from around the area. Then use rotary wire brush installed in air motor and wire brush rework the machined area or the disk to remove sharp edges. Finally thoroughly clean area and remove mask. This complete procedure should be repeated for each pocket to be machined.

While the preferred embodiment of our invention has been described fully in order to explain its principles, it is understood that various modifications or alterations may be made to the preferred embodiment without departing from the scope of the invention as set forth in the appended claims.

We claim:

1. A fixture for machining a gas turbine rotor having rotor blade slots and a rim having a forward face, said fixture comprising:
   a root removably insertable into the blade slots, said root shaped to conform to the rotor blade slot, said root further including a tang to butt up against the forward face of the rim, thereby axially fixing the position of the root;
   a base attached to said root;
   a machining guide connected to said base;
   a C-shaped tool guide slot extending through said machining guide, said base and said root; and
   a means to removably mount said root to the rotor in a fixed position relative to the rotor.

2. The fixture as claimed in claim 1 wherein said tool guide slot has a cutting length wider than the widest width of the rim to accept a beveling tool.

3. A fixture for machining a gas turbine rotor having rotor blade slots, said fixture comprising:
   a root removably insertable into the blade slots,
   a machining guide connected to said root the machining guide including a platform;
   a tool guiding slot extending through said machining guide and said rotor;
   said machining guide further includes a tool guiding bearing having an upper portion resting on said platform and a hollow axle disposed through said tool guiding slot, said tool guiding bearing further including a bottom section disposed in a chamber beneath said platform and rotatably mounted to said hollow axle, wherein said hollow axle is operable to receive and help guide a machining tool therein; and
   means to removably mount said root to the rotor in a fixed position relative to the rotor.

* * * * *